INVENTORS
FREDERICK J. KOVAC
GROVER W. RYE

BY *J.B. Holden*
ATTORNEY

United States Patent Office 3,261,388
Patented July 19, 1966

3,261,388
PNEUMATIC TIRE
Frederick J. Kovac, Akron, and Grover W. Rye, Cuyahoga Falls, Ohio, assignors to The Goodyear Tire & Rubber Company, Akron, Ohio, a corporation of Ohio
Continuation of application Ser. No. 155,902, Nov. 30, 1961. This application Aug. 2, 1965, Ser. No. 477,665
5 Claims. (Cl. 152—330)

This application is a continuation of application Serial No. 155,902, filed November 30, 1961, and now abandoned.

This invention relates to pneumatic tires and, more particularly, to a pneumatic tire construction which enables it to be recapped in such manner and within such time as to assure maximum retread tire mileage and minimum danger of tire failure or destruction.

It is tantamount to producing a satisfactory retread that the retreading or recapping be done before excessive wearing away of the tread and undertread occurs and, in any event, prior to the time that the reinforcing plies of the carcass are exposed. Satisfactory recapping, therefore, presupposes that the tire will reach the recapper prior to the time that the fabric reinforcements of the tire are exposed. It is also clearly apparent that during the recapping operations wherein the tire is buffed or skived in the tread area that extreme caution be taken by the recapper so that the fabric reinforcements of the tire are not damaged.

In the prior art is well known to provide a tire with a layer of rubber above the carcass of a color which contrasts with the color of the rubber contained in the tread or carcass so that the user of the tire will be warned that the tire should be removed for retreading. However, it has been impossible to compound a rubber composition which contrasts with the color of carbon black reinforced stocks and still have the same physical characteristics of carbon black reinforced stock. As a consequence, the inclusion of a stock having a contrasting color in the tread or undertread area of a tire results in a weak link between the tread and the undertread or carcass which simply is not satisfactory for modern day tires which must operate at increasingly higher sustained speeds and loads.

It is an object of this invention to provide visible means for indicating when the tread has worn to the point at which it should be recapped, or to warn the tire recapper that sufficient rubber has been removed during the skiving operation prior to application of the new tread rubber without introducing a weakness into the tire.

It is a further object of this invention to provide a visible means for indicating the tread depth of a tire which means may be used as a reinforcement in the tire of equal durability to conventional tire reinforcements.

Other objects and advantages of the invention will be more fully understood from the following detailed description when read in reference to the accompanying drawings, in which.

Figure 1:
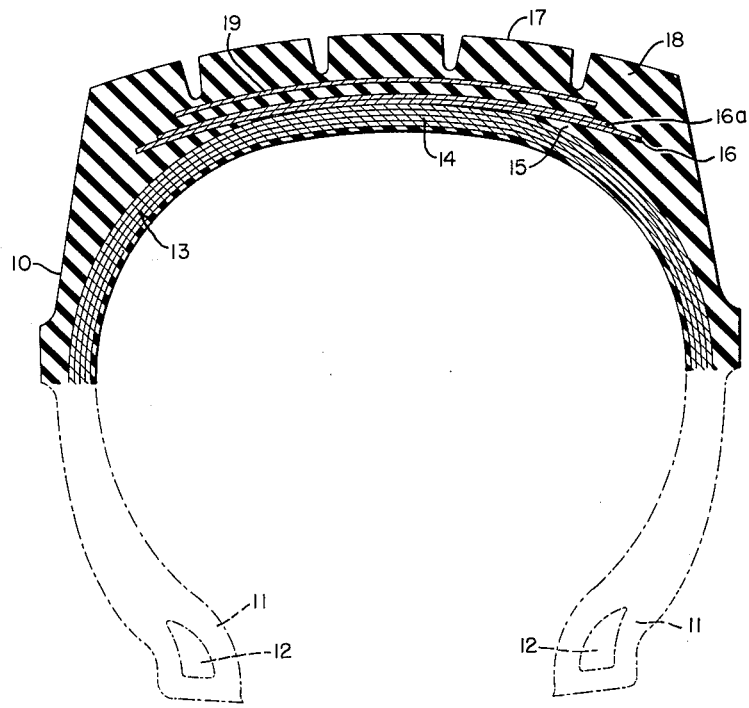
FIG. 1 is a cross-sectional view of a tire constructed in accordance with the present invention.

Referring to the drawings, a tire constructed in accordance with the present invention comprises a carcass 10 of the usual open-bellied hollow construction having a pair of spaced beads 11 containing bead rings 12 around which a plurality of plies 13 of parallel extending cords are turned. The cords of the ply 13 for the purposes of this invention may be made of any of the usual tire cord materials, such as rayon, nylon, metallic wire, and the like. In the crown area 14 of the tire 10, a layer of cushion gum 15 is positioned between the carcass plies 13 and the breaker plies 16 and 16a, although in many tire constructions the breaker 16 may be omitted. Located between the carcass plies 13 and the tread surface 17 of the tread 18 is a ply 19 which is preferably located above the breakers 16, if breakers are used, at the interface between the tread 18 and the carcass plies 13. Then too, the ply 19 may be substituted for the top breaker 16a. The ply 19 is a tread depth or wear indicator made of a filamentary synthetic textile material, the filaments of which are made of a synthetic organic polymeric resin, such as regenerated cellulose, or a synthetic polymeric material including the polyamides, polyesters, polyolefins, polypropylenes, and polyethylenes. The synthetic organic polymeric fibers are spun from a liquid in which the polymeric resin is in solution, or is melted, and prior to spinning of the fibers a suitable coloring pigment or dye is incorporated into the liquid polymeric resin forming a dispersion mixture or solution of resin and coloring material which imparts an integral color to the fibers or filaments sharply contrasting with the color of synthetic polymeric greige tire cords or fabrics. Conventional polymeric greige tire cord fabrics are formed from undyed raw cellulosic or resinous polymeric materials and have a color of various shades of light grays and tans.

Figure 2:
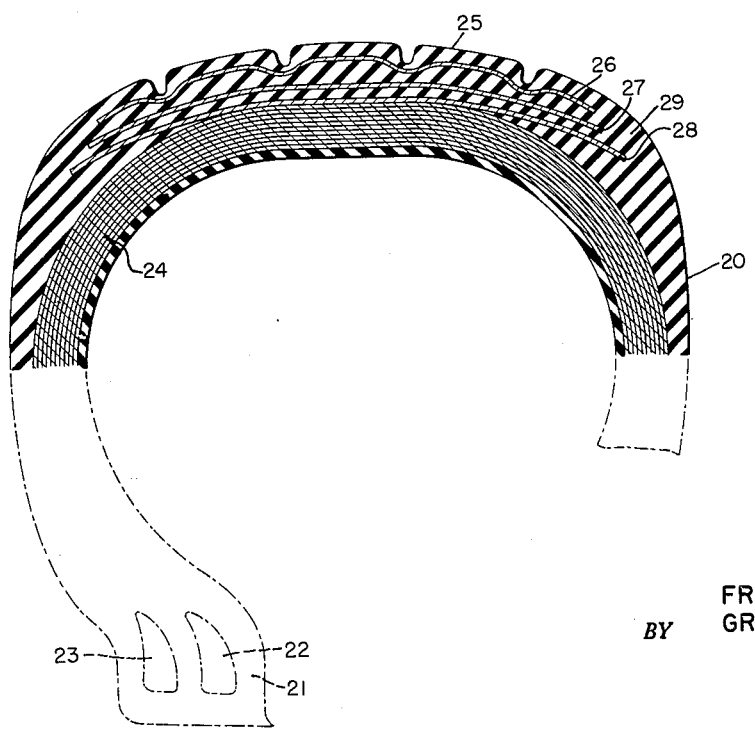
FIG. 2 is a cross-sectional view of a high-speed aircraft tire incorporating a modification of the present invention.

FIG. 2 of the drawings shows a modification of the present invention consisting of a jet or high-speed aircraft tire 20 of the usual open-bellied hollow annular form having a carcass with spaced beads 21, each of which contains a plurality of bead rings 22 and 23. A large number of plies 24 are wrapped around each of the beads 22 and extend from one bead area 21 to the other. The tread 25 includes a plurality of radially spaced plies 26, 27, and 28 made of parallel cords terminating in the shoulders 29. In such high-speed aircraft tires, the fabric plies 26, 27, and 28 are exposed consecutively as the tread is worn away and in accordance with this invention, the plies 26 and 27 are made of a synthetic organic polymeric fiber spun from a liquid having a dye incorporated into the resin so that the plies 26 and 27 are of a color corresponding to the color of tread stock 25. The ply 28 or the last tread ply is likewise made of a liquid spun synthetic organic polymeric fiber but having a dye contained therein such that the color of the ply 28 sharply contrasts with the color of the carcass plies 23, as well as the plies 26 and 27. Thus, during normal wear of the tread 24 through plies 26 and 27, the reinforcing fabric plies will not be visible in the surface of the tread. However, after the tread has been worn and reaches or approaches its designed tread life, the tread ply 28 will be exposed and the sharply contrasting color thereof will act as a warning indicator that the tread should be either scrapped or retreaded.

The manner in which the liquid spun synthetic organic fiber or filamentary material is incorporated in the ply 19 of FIG. 1 or the ply 28 of FIG. 2 is not critical to the concept of this invention. The plies 19 and 28 may be rubber layers having embedded therein the synthetic organic filamentary material in the form of parallel twisted cords, or untwisted yarns, or bundles of filaments which are square woven, weak weft or weftless, or a plurality of short lengths of cords, yarns, or filaments may be mixed with rubber on a mill, or the like, and calendered into thin sheets which are cut to the proper dimensions to form the plies 19 or 28. In the latter construction the lengths of the cords, yarns, or filaments may be varied from about ¼ inch to about 2 inches and are mixed in the rubber in an amount from about 3 to about 10 percent by volume of the rubber contained in the ply.

Various coloring pigments or dye materials may be incorporated into the polymeric synthetic resin from which the filamentary materials used in the plies 19 and 28 are made. As previously indicated, it is preferred that the polymeric synthetic resin include a very fine particle size pigment or dye material in an amount from .1 to 5 percent by weight which produces a color in the finished fiber which sharply contrasts with the color of greige cord or fibrous material, such as, for example, a brilliant red, green, blue or yellow. Any one of many well-known coloring pigments or dye colors may be used so long as the pigment or dyestuff is chemically and color stable at the temperature at which the polymeric material is spun into fibers. This temperature is normally between 400 and 500° F. In the case of rayon, a small amount of a suitable dye, such as diamine, Fast Red F made by General Aniline Film Corporation, may be added to the liquid cellulose prior to spinning of the fibers to produce a brilliant red rayon fiber. Copper phthalocyanine blue may be used with polyesters. Cadmium sulfide pigments may be used to produce reds or yellows, and chrome oxide pigments may be used to produce greens when used in other synthetic organic polymeric resins. To produce polymeric materials for filamentary plies 26 and 27 of FIG. 2 having a black color which corresponds or blends with that of black rubber, very fine particle size carbon black in an amount equal to 1.5 to 3 percent by weight of the resin may be added thereto.

It is thus seen that this invention provides a tire having a visible, sharply contrasting wear indicator which may be used as a reinforcement in the tire and which will remain visible even though it is abraded during use or during the recapping operation.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a carcass terminating in spaced bead portions, a tread secured to said carcass, and a ply embedded in said tire radially outwardly of said carcass, said ply comprising a synthetic filamentary polymeric material having a dye incorporated in the polymer, said dye being of a color contrasting with the color of the remaining portion of the tire both adjacent said ply and radially outwardly thereof.

2. A pneumatic tire comprising an open-bellied hollow annular carcass terminating in spaced apart bead portions, a tread secured to said carcass, and a ply embedded in said tire radially outwardly of said carcass, said ply comprising synthetic filamentary polymeric material having incorporated in the polymer a dye having a color matching the color of the remainder of the tire next adjacent said ply.

3. A high-speed aircraft tire comprising an open-bellied hollow annular carcass terminating in spaced apart bead portions, a tread secured to said carcass, said carcass having a plurality of plies of parallel cords embedded therein and extending from bead to bead, a plurality of tread plies of textile parallel cords disposed within said tread and spaced from each other, from the carcass and from the tread surface, at least the radially innermost of said tread plies consisting of a synthetic filamentary polymeric material having a dye incorporated in said polymer, said dye being of a color contrasting with the color of the other tread plies in said tread as well as the color of the rubber in said tread.

4. A high-speed aircraft tire comprising an open-bellied hollow annular carcass terminating in spaced apart bead portions, a tread secured to said carcass, said carcass having a plurality of plies of parallel cords embedded therein and extending from bead to bead, a plurality of tread plies of textile material disposed within said tread and spaced from each other, from the carcass and from the tread surface, at least the radially outermost of said tread plies consisting of a synthetic filamentary polymeric material having a black dye incorporated in said polymer.

5. A high-speed aircraft tire comprising an open-bellied hollow annular carcass terminating in spaced apart bead portions, a tread secured to said carcass, said carcass having a plurality of plies of parallel cords embedded therein and extending from bead to bead, at least two plies of textile material disposed within said tread and spaced from each other, from the carcass and from the tread surface, the radially outermost tread ply consisting of a synthetic filamentary polymeric material having a black dye incorporated in said polymer, whereby the color of said tread ply corresponds to the color of said tread, and the radially innermost ply consisting of rubber reinforced with a synthetic filamentary polymeric material having a dye incorporated in said polymer, the dye of said radially innermost ply being of a color contrasting with the color of both the carcass plies and other tread plies.

References Cited by the Examiner

UNITED STATES PATENTS 2,943,663   7/1960   Antonson _____ 152—356

ARTHUR L. LA POINT, *Primary Examiner.*

C. W. HAEFELE, *Assistant Examiner.*